United States Patent
Das

(10) Patent No.: US 6,680,997 B2
(45) Date of Patent: Jan. 20, 2004

(54) SYSTEM AND METHOD FOR ENABLING A HIGH TORQUE/HIGH SPEED BRUSHLESS DC MOTOR

(75) Inventor: A. Kumar Das, Monroe, CT (US)

(73) Assignee: Kendro Laboratory Products, LP, Newtown, CT (US)

( * ) Notice: Subject to any disclaimer, the term of this patent is extended or adjusted under 35 U.S.C. 154(b) by 0 days.

(21) Appl. No.: 10/305,055

(22) Filed: Nov. 27, 2002

(65) Prior Publication Data

US 2003/0080729 A1 May 1, 2003

Related U.S. Application Data

(62) Division of application No. 09/728,807, filed on Dec. 2, 2000, now Pat. No. 6,493,924.

(51) Int. Cl.$^7$ .............................................. H02K 23/00
(52) U.S. Cl. ...................... 378/234; 138/439; 138/779
(58) Field of Search ................................ 318/779, 798, 318/799, 567, 569, 254, 138, 439, 771

(56) References Cited

U.S. PATENT DOCUMENTS

| | | | | |
|---|---|---|---|---|
| 4,409,539 A | * | 10/1983 | Nordbrock et al. | 322/28 |
| 5,886,497 A | * | 3/1999 | Zaharia | 318/779 |
| 6,493,924 B2 | * | 12/2002 | Das | 29/596 |

* cited by examiner

Primary Examiner—Karen Masih
(74) Attorney, Agent, or Firm—Baker & Hostetler LLP

(57) ABSTRACT

A high torque/high speed brushless DC motor system for controlling both the speed and torque of the motor including a rotor and a stator, the stator of the motor including a first, second and third winding. The system further includes means for sensing the position of the rotor and means for selectively configuring the first, second and third windings of the stator in a wye connection when the speed of the motor is less than a predetermined value and configuring the windings in a delta connection when the speed of the motor is greater than the predetermined value.

13 Claims, 4 Drawing Sheets

SYSTEM AND METHOD FOR ENABLING A HIGH TORQUE/HIGH SPEED BRUSHLESS DC MOTOR

This application is a divisional of and claims priority to the application Ser. No. 09/728,807 entitled, "System and Method for Enabling a High Torque/High Speed Brushless DC Motor", filed Dec. 2, 2000 is now U.S. Pat. No. 6,493,924, the disclosure of which is incorporated herein by reference.

BACKGROUND OF THE INVENTION

1. Field of the Invention

The present invention relates to a brushless DC motor, and more particularly, to a system and method for controlling the torque and speed of the brushless motor.

2. Description of the Prior Art

A typical brushless DC motor includes a stator, including three windings, spaced at 120 degree electrical from one another, for imparting a torque on a rotor. The torque imparted on the rotor causes the rotor to rotate. Those skilled in the art of motors and generators appreciate the efficiency, economy and simplicity of brushless DC motors wherein there is no actual physical contact between the stator windings and the rotor. In order to effectuate the operation of the motor, a properly timed and spaced magnetic field is synthesized in the stator windings which imparts a torque on the rotor and causes the rotor to rotate.

The typical brushless DC motor is permanently configured in one of two basic configurations—either a wye connection or a delta connection. A motor with windings configured in the delta configuration can operate at a greater speed than the same windings configured in the wye configuration. However, a motor with windings configured in the wye configuration can operate with a greater torque at low speeds than the same windings configured in the delta configuration.

Accordingly, in an application requiring high torque at a low speed, the motor is permanently configured in the wye configuration. Consequently, a conventional brushless motor design requires a compromise between high torque at a low speed and low torque at a high speed.

One application of a brushless DC motor is that of providing a source of motive energy for driving a centrifuge rotor in a centrifuge system. A centrifuge system is a device by which liquid samples may be subjected to centrifugal forces. The sample is carried within the centrifuge rotor, which is mounted to a rotatable drive shaft that is driven by the brushless motor. A centrifuge system using a brushless motor with windings permanently configured in either a delta configuration or a wye configuration is limited by the aforementioned compromise between high torque at a low speed and low torque at a high speed.

There is a need for a system and method for enabling a brushless DC motor to operate with high torque at a low speed for high torque-low speed centrifuge rotors as well as to operate at high speeds at a reduced torque for high speed-low torque centrifuge rotors, thus permitting the use of a wide range of centrifuge rotors.

SUMMARY OF THE INVENTION

A high torque/high speed brushless DC motor system for controlling both the speed and torque of the motor includes a rotor and a stator. The stator of the motor includes a first, second and third winding. The system further includes means for configuring the first, second and third windings in a wye connection when the speed of the motor is less than a predetermined value and configuring the windings in a delta connection when the speed of the motor is greater than the predetermined value.

In one aspect of the invention, switching means are included in the motor system for implementing the stator winding connection configuration changes. The switching means of the system can be common to both the wye and delta connection configurations.

A method is also disclosed herein for effectuating the configuration of the brushless DC motor in a wye connection when the speed of the motor is less than the predetermined value and configuring the windings in a delta connection when the speed of the motor is above the predetermined value. The method of the present invention can be further implemented by a storage media containing computer readable program instructions for controlling a processor to control a brushless DC motor in accordance with the methods of the present invention.

It yet another aspect of the invention, a storage media having computer readable program instructions embodied therein for controlling a processor, which in turn, controls a brushless DC motor in accordance with the method of the invention.

DETAILED DESCRIPTION OF THE INVENTION

Figure 1:
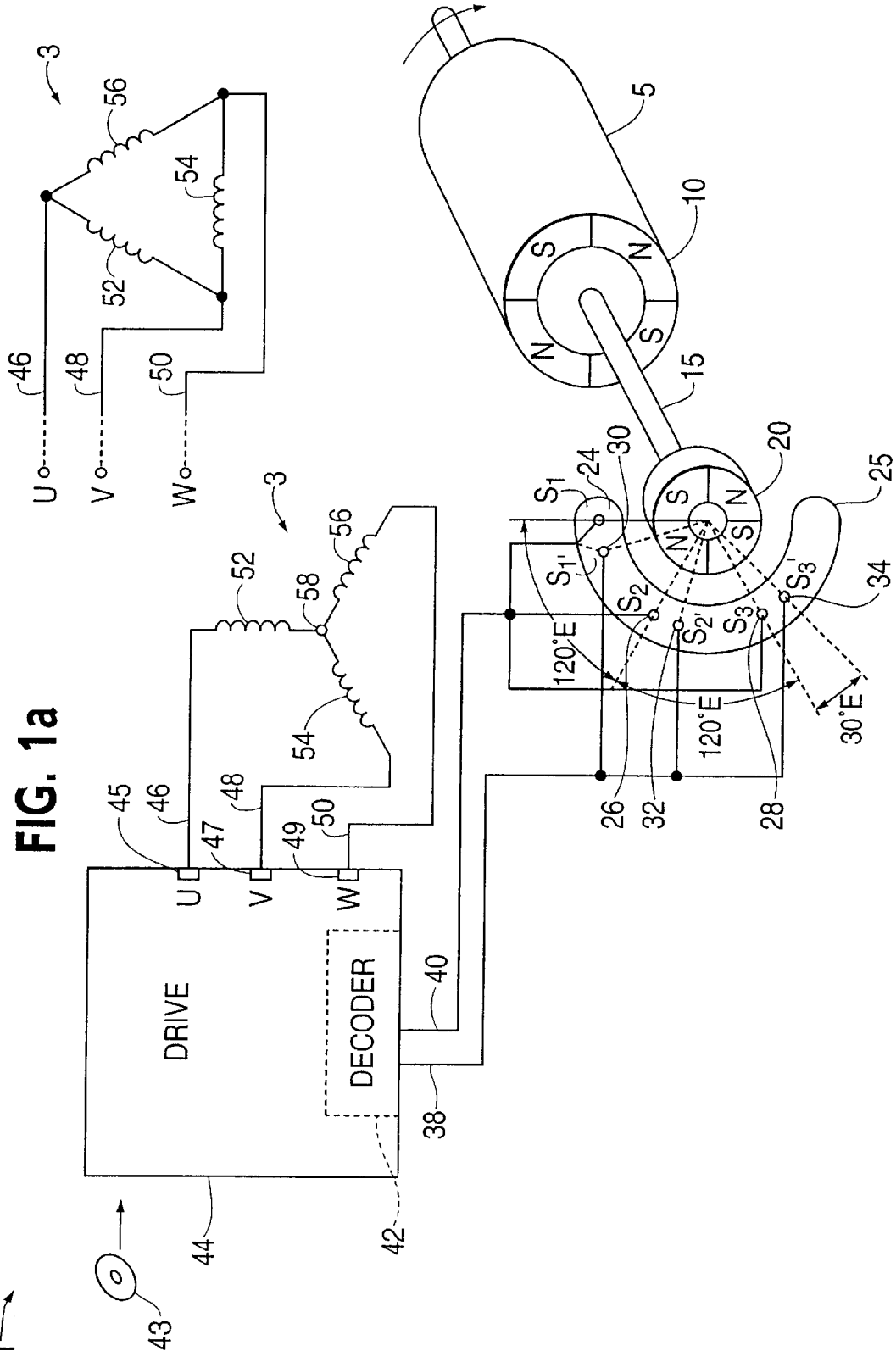
FIG. 1a is a schematic diagram of a brushless DC motor system embodying the present invention, including a stator configured in a wye connection.
FIG. 1b depicts the schematic diagram of the stator of FIG. 1a configured in a delta connection.

Referring to FIG. 1a, a brushless DC motor system 1 has a rotor 5 and a stator 3, the configuration of stator 3 is controlled to enable stator 3 to be selectively configured in either a wye connection or a delta connection to achieve a high motor torque, and a high speed operation. Accordingly, a stator connection configuration procedure is used to configure stator 3 connection depending on the speed of rotor 5.

Stator 3 includes three windings, namely a first winding 52, a second winding 54 and a third winding 56. Stator 3 is shown configured in a wye connection in FIG. 1a and in a delta connection in FIG. 1b. Whether the stator windings are configured in a wye connection or a delta connection depends on the speed of rotor 5. To achieve a high torque, the stator windings are configured in the wye connection shown in FIG. 1a. In order to achieve a high speed, the stator windings are configured in the delta connection shown in FIG. 1b. The capability to change the configuration of the stator windings of the present invention enables the present invention to overcome traditional maximum torque and maximum speed limits encountered in conventional brushless DC motors operating with stator windings permanently configured in either a fixed wye connection or a fixed delta connection.

The brushless DC motor system 1 synthesizes a rotating magnetic field in stator 3 windings to induce a rotation of rotor 5, and in particular, a rotation of rotor shaft 15. System 1 uses rotor position sensors 24, 26, 28, 30, 32, and 34 to sense a position of rotor 5 for synthesizing a rotating magnetic field in the stator 3 that is at quadrature (i.e., 90 degrees electrical) for all positions of rotor 5 to induce a rotation of rotor shaft 15. Accordingly, the current flow through each of stator windings 52, 54, and 56 is sequentially switched with the proper timing to synthesize a rotating magnetic field in the windings.

Referring to FIG. 1a, stator 3 has a first winding 52, a second winding 54 and a third winding 56. Each of the windings has a first terminal attached to a drive signal source of a drive controller 44. The first winding 52 has a first terminal attached to a drive signal source 45 by the line 46, see both FIGS. 1a and 1b. The second winding 54 has a first terminal attached to a drive signal source 47 by the line 48. Third winding 56 has a first terminal attached to a drive signal source 49 by line 50.

Stator windings 52, 54, 56 are configured in the wye connection in FIG. 1a, thus the second terminal of each of windings is connected to a common point 58. Configured in the delta connection in FIG. 1b, the second terminal of each winding is connected to another drive signal source. The second terminal of first winding 52 is connected to second drive signal source 47 by line 48. The second terminal of second winding 54 is connected to third drive signal source 49 by line 50. The second terminal of third winding 56 is connected to first drive signal source 45 by line 46.

Rotor 5 of the system 1 has four permanent magnets constituting four main poles 10. Rotor 5 also has a rotatable shaft 15 to which a commutation magnet 20 is attached. Commutation magnet 20 has the same number of magnetic poles, four, as rotor 5. Brushless DC motor system 1 has rotor position sensors 24, 26, 28, 30, 32, and 34 to detect the magnetic field (i.e., the flux) originating from commutation magnet 20. System 1 typically has one rotor position sensor for each stator winding, for each stator configuration. Thus, system 1 has six rotor position sensors, a set of three rotor position sensors 24, 26 and 28, one for each of the stator windings, for the wye configuration; and a set of three rotor position sensors 30, 32 and 34, one for each of the stator windings, for the delta configuration. The rotor position sensors, in one aspect of the invention, are Hall type magnetic sensors. The rotor position sensors are not limited to being Hall type sensors.

In order to synthesize a properly timed and sequenced rotating magnetic field, the wye rotor position sensors and delta rotor position sensors 30, 32, 34 are separated one from the other by 120 degrees electrical. Thus, the signals detected by adjacent wye (24, 26, 28) or delta (30, 32, 34) sensors lag or lead one another by 120 degrees, depending on the direction of, the rotor rotation. Furthermore, the three wye connection rotor position sensors 24, 26, 28 are spaced 30 degrees electrical from the three delta connection rotor position sensors 30, 32, 34. Thus, there is a 30 degree difference between corresponding detected wye and delta sensor signals.

The magnetic flux originating in commutation magnet 20 and detected by rotor position sensors 24, 26, 28, 30, 32 and 34 generate a three phase encoded signal. The phase encoded signal is provided to a drive controller 44 by lines 38 and 40. Drive controller 44 includes a decoder that interprets the phase-encoded signal so that the drive controller can switch the current flow through the stator windings off and on in the proper sequence and with the proper timing to produce a rotating magnetic field in stator 3 that induces a rotation of commutation magnet 20, and thus rotor 5.

Although a total of six rotor position sensors are depicted in FIG. 1a, three each for the wye configuration and the delta configuration of the stator windings, brushless DC motor system 1 may instead have only three rotor position sensors. The single set of three rotor position sensors detect the position of the rotor 5 when the rotor windings are configured in both a wye connection and a delta connection. Due to the aforementioned 30 degree phase difference between the wye and delta rotor position sensors and the three phase encoded signals detected by the same, a microprocessor or other means, is used at the transition between wye and delta stator configuration to shift the signal sensed by the rotor position sensors by 30 degrees when using only one set of three rotor position sensors. The phase shift accounts for 30 degree phase shift of line to line voltages when the windings are switched from the wye to the delta configuration.

Figure 2:
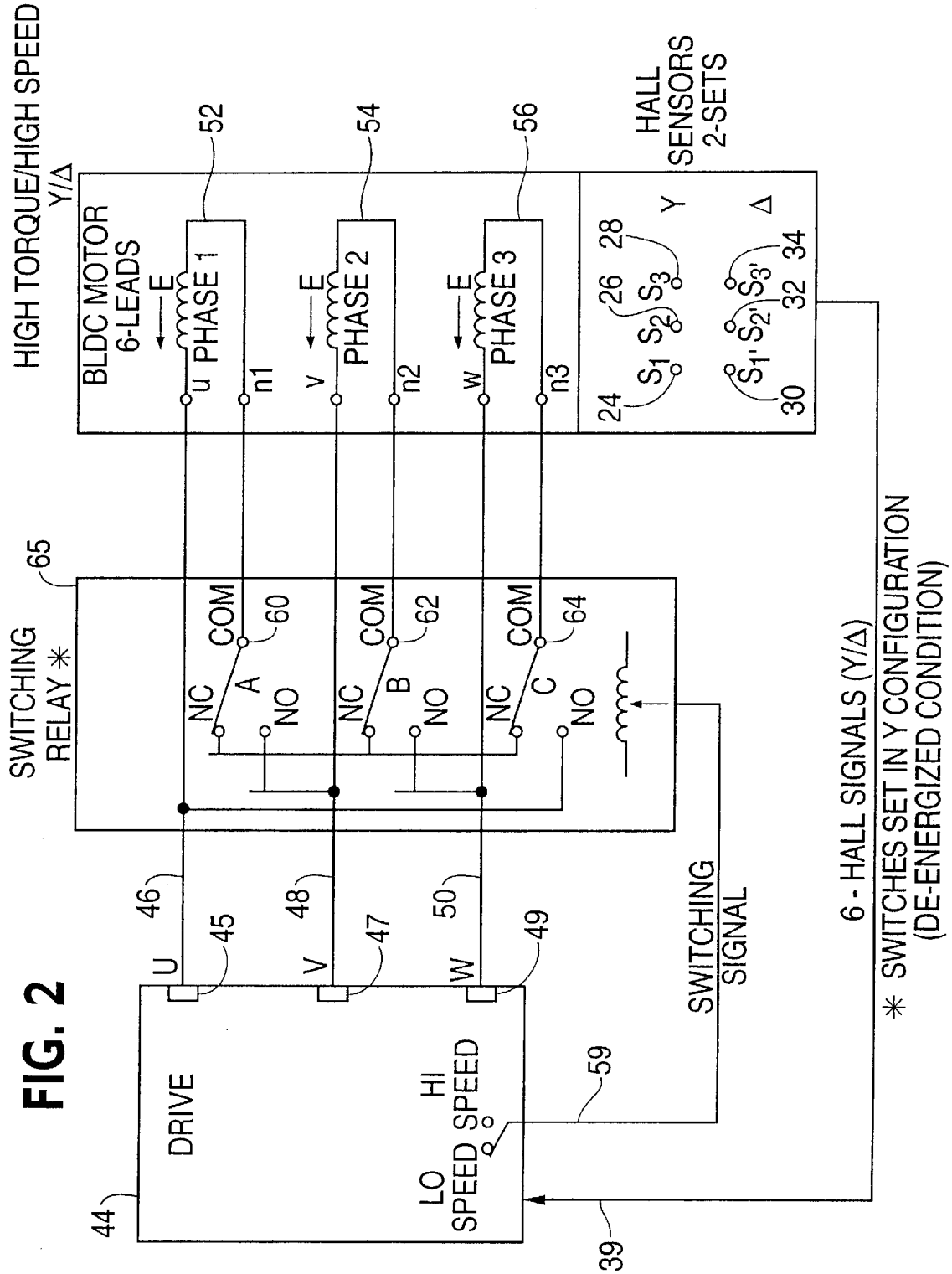
FIG. 2 is a schematic diagram including switching means and the windings configured in a wye connection of the invention of FIG. 1.

As indicated above, the brushless DC motor system 1 is enabled to be configured with the stator windings in a wye connection so that the motor can achieve high torque operation. Referring to FIG. 2, a schematic of drive controller 44, the windings and a switching means 65 with the windings configured in the wye connection is shown. As FIG. 2 shows, the first terminal of windings 52, 54 and 56 have a first terminal connected to the first, second and third drive signal sources 45, 47 and 49, respectively. The second terminal of the first, second and third windings are connected to points 60, 62 and 64 which are all tied together (i.e., common) in the switching means 65.

Figure 3:
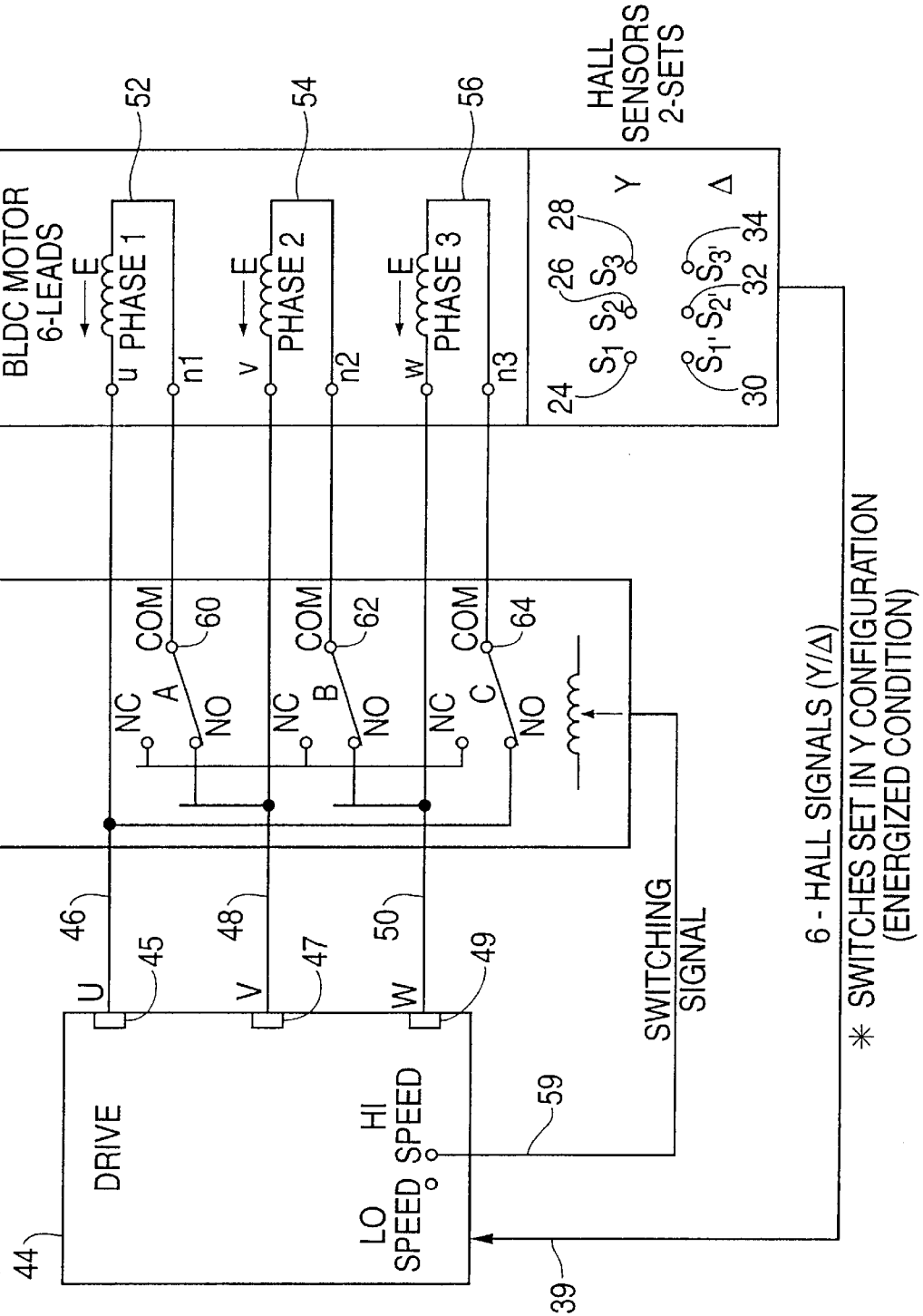
FIG. 3 is a schematic diagram including switching means and the windings configured in a delta connection of the invention of FIG. 1.

The FIG. 3 shows a schematic of drive controller 44, the windings and switching means 65 with the windings configured in the delta connection. The first terminal of each of the three windings 52, 54 and 56 has a first terminal connected to the first, second and third drive signal sources 45, 47 and 49, respectively. The second terminal of first winding 52 is connected to second drive signal source 47 by line 48; the second terminal of second winding 54 is connected to third drive signal source 49 by line 50; and the second terminal of third winding 56 is connected to first drive signal source 45 by line 46.

The FIGS. 2 and 3 depict the substantially the same components, the difference is that switching means 65 is configured to selectively connect stator windings 52, 54, 56 in the wye connection in FIG. 2 and the switching means 65 is configured to selectively connect stator windings 52, 54, 56 in the delta connection in FIG. 3. Common to each configuration however, there is a switching signal that is sent from the drive controller 44 to switching means 65 by line 59. The switching signal enables control of switching means 65 to change the configuration of the windings from the wye connection to delta connection and vice versa. The phase encoded signals, containing information related to the relative position of rotor 5, from rotor position sensors 24, 26, 28, 30, 32 and 34 are supplied to drive controller 44 by line 39.

Figure 4:
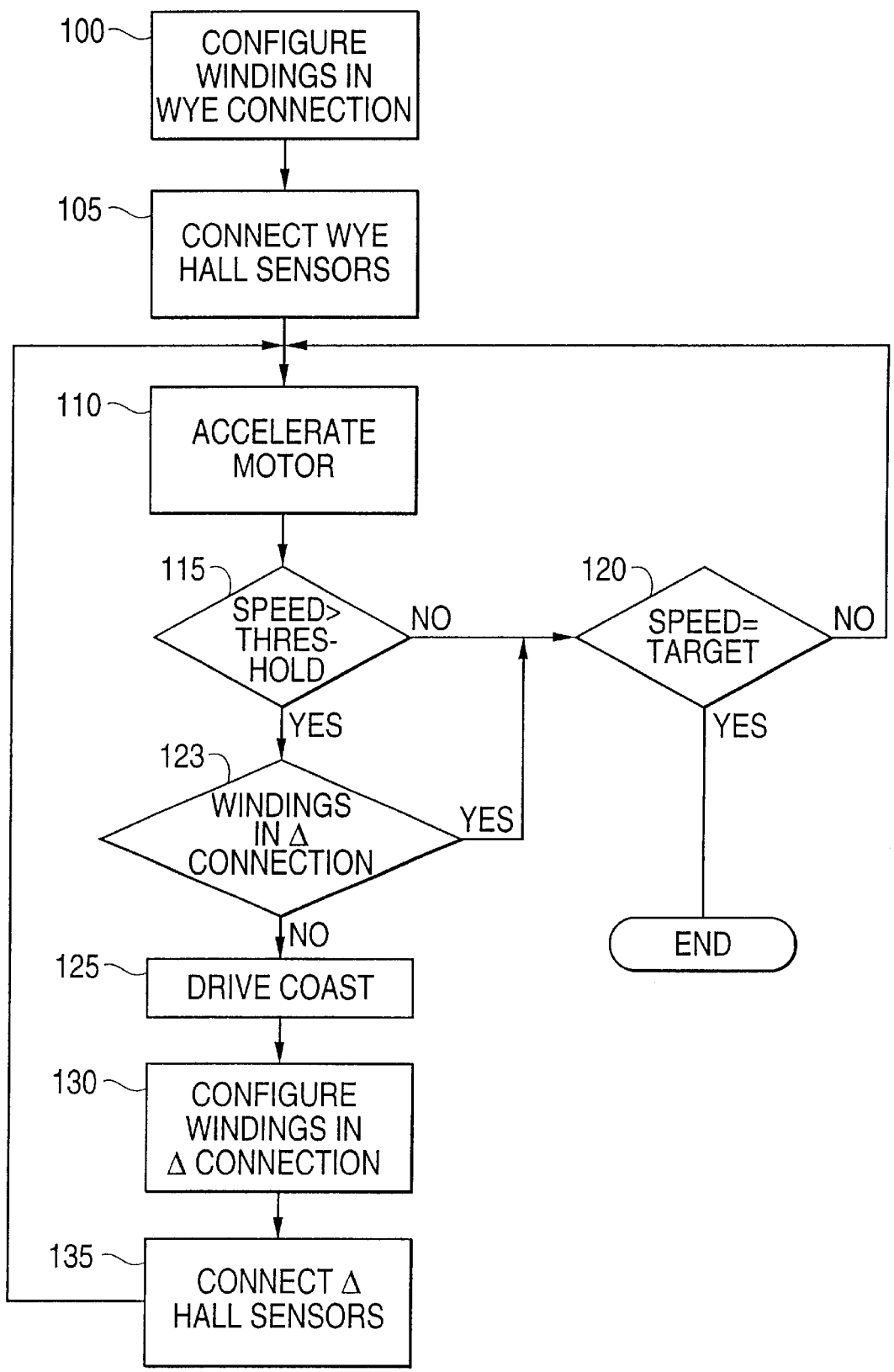
FIG. 4 is a logical flow diagram illustrating a method of the invention of FIG. 1.

Referring to the logical flow diagram of FIG. 4, the invention will be further described. The stator windings 52, 54, 56 of the brushless DC motor system 1 are first configured in a wye connection (step 100). This is the typical starting configuration since the stator windings 52, 54, 56 are configured in the wye connection for low speeds (and high torque). To enable the proper timing of the rotating magnetic field in the stator required to initiate and sustain rotation of the rotor, the wye connection rotor position sensors 24, 26, 28 are connected to the drive controller (step 105). The motor is accelerated by synthesizing a rotating magnetic field in the stator windings 52, 54, 56 (step 110). A determination is then made whether the motor has reached a selected, predetermined threshold speed (step 115). The threshold speed is the predetermined speed above which the configuration of the motor is switched from the wye connection to the delta connection so that high speed (and low torque) operation of the motor can be achieved. When the speed is determined to be below the threshold speed, the speed of the motor is recursively checked (steps 115, 120 and 110) until the threshold speed is exceeded (step 115) or the desired target speed is obtained (step 120). Thereafter, the configuration process is ended since there is no longer a need to accelerate the motor, and the speed of the motor is maintained at the target speed.

When a determination is made at step 115 that the threshold speed has been exceeded, then a determination is made whether the windings 52, 54, 56 are already configured in the delta connection (step 123). If the windings 52, 54, 56 are configured in the delta connection, then the speed of the motor is checked to determine whether the motor has reached its target speed (step 120). If the windings 52, 54, 56 of the motor are not configured delta configuration, then the motor enters a momentary drive coast (step 125). Next, the windings 52, 54, 56 are configured for the delta connection (step 130) and the rotor position sensors for the delta configuration 30, 32, 34 are connected (step 135). Thereafter, the configuration process continues with the continued acceleration, verification and/or maintenance (steps 110, 115 and 120) of the motor speed until the target speed is obtained.

Those skilled in the art, having the benefit of the teachings of the present invention may impart numerous modifications thereto without departing from the present invention. Such modifications, such as, for example, including computer readable program instructions embodied on a storage media such as a CD-ROM or other static memory, for carrying out the methods of the present invention are to be construed as lying within the scope of the present invention, as defined by the appended claims.

What is claimed is:

1. A system for controlling a brushless DC motor, said motor including a rotor and a stator, said stator including a first winding, a second winding and a third winding, said system comprising:

means for selectively configuring said first, second and third windings in a wye connection when the speed of said motor is less than a predetermined value, and for selectively configuring said first, second and third windings in a delta connection when the speed of said motor is greater than said predetermined value.

2. The system of claim 1 wherein, for said wye connection, said configuring means comprises:

a first switch means for connecting a first terminal of said first winding to a first drive signal source and a second terminal of said first winding to a common node;

a second switch means for connecting a first terminal of said second winding to a second drive signal source and a second terminal of said second winding to said common node; and a third switch means for connecting a first terminal of said third winding to a third drive signal source and a second terminal of said third winding to said common node.

3. The system of claim 1 wherein, for said delta connection, said configuring means comprises:

a first switch means for connecting a first terminal of said first winding to a first drive signal source and a second terminal of said first winding to a second drive signal source;

a second switch means for connecting a first terminal of said second winding to said second drive signal source and a second terminal of said second winding to a third drive signal source; and a third switch means for connecting a first terminal of said third winding to said third drive signal source and a second terminal of said third winding to said first drive signal source.

4. The system of claim 1, wherein said first winding has a first terminal connected to a first drive signal source, said second winding has a first terminal connected to a second drive signal source, said third winding has a first terminal connected to a third drive signal source, and said configuring means comprises:

a first switch means for connecting a second terminal of said first winding to a common node for said wye connection configuration, and for connecting said second terminal of said first winding to said second drive signal source for said delta connection configuration;

a second switch means for connecting a second terminal of said second winding to said common node for said wye connection configuration, and for connecting said second terminal of said second winding to said third drive signal for said delta connection configuration;

a third switch means for connecting a second terminal of said third winding to said common node for said wye connection configuration, and for connecting said second terminal of said third winding to said first drive signal source for said delta connection configuration; and a processor for controlling said first, second and third switch means.

5. The system of claim 1 wherein said configuring means further comprises:

a first set of rotor position sensors for sensing a position of said rotor for said wye connection configuration, one rotor position sensor for each of said windings;

means for synthesizing a rotating magnetic field in said windings for said wye connection configuration by sequentially switching a current flow through said windings in response to said rotor position sensed by said first set of rotor position sensors;

a second set of rotor position sensors for sensing said position of said rotor for said delta connection configuration, one rotor position sensor for each of said windings; and means for synthesizing a rotating magnetic field in said windings for said delta connection configuration by sequentially switching said current flow through said windings in response to said rotor position sensed by said second set of rotor position sensors.

6. The system of claim 5 wherein said first set of rotor position sensors and said second set of rotor position sensors differ in phase.

7. The system of claim 6 wherein said first set of rotor position sensors and said second set of rotor position sensors differ in phase by about 30 degrees electrical.

8. The system of claim 5 wherein said rotor position sensors comprise Hall type magnetic sensors.

9. The system of claim 1 wherein said configuring means further comprises:

a set of rotor position sensors for sensing a position of said rotor, one rotor position sensor for each of said windings;

means for synthesizing a rotating magnetic field in said windings for said wye connection configuration by sequentially switching a current flow through said windings in response to said rotor position sensed by said rotor position sensors; and means for synthesizing a rotating magnetic field in said windings for said delta connection configuration by sequentially switching said current flow through said windings in response to said rotor position sensed by said rotor position sensors, wherein the phase of said set of rotor position sensors configured for said wye connection configuration differs by a phase shift.

10. The system of claim 9 wherein the phase of said set of rotor position sensors configured for said wye connection configuration differs by a phase shift of about thirty degrees electrical from the phase of said set of rotor position sensors configured for said delta connection configuration.

11. The system of claim 9 wherein said rotor position sensors comprises Hall type sensors.

12. The system of claim 9 further comprising a processor for controlling the phase shift of said rotor position sensors.

13. The system of claim 1 wherein the torque of said motor is higher at speeds lower than said predetermined value than at speeds greater than said predetermined value.

* * * * *